May 14, 1968  J. M. CAZIER  3,383,092
GAS TURBINE WITH PULSATING GAS FLOWS
Original Filed Sept. 6, 1963  2 Sheets-Sheet 1
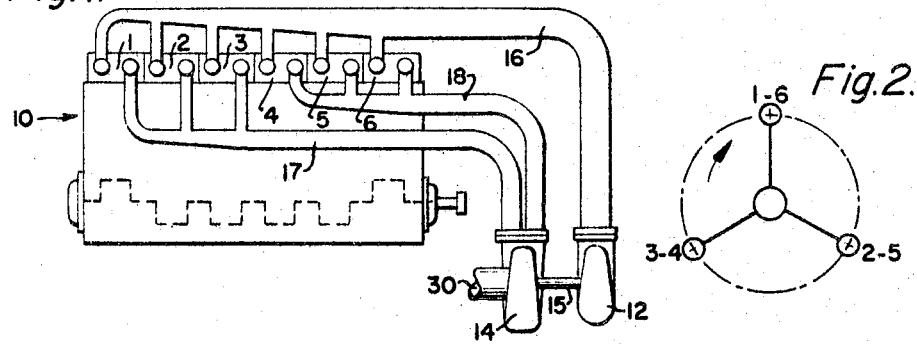
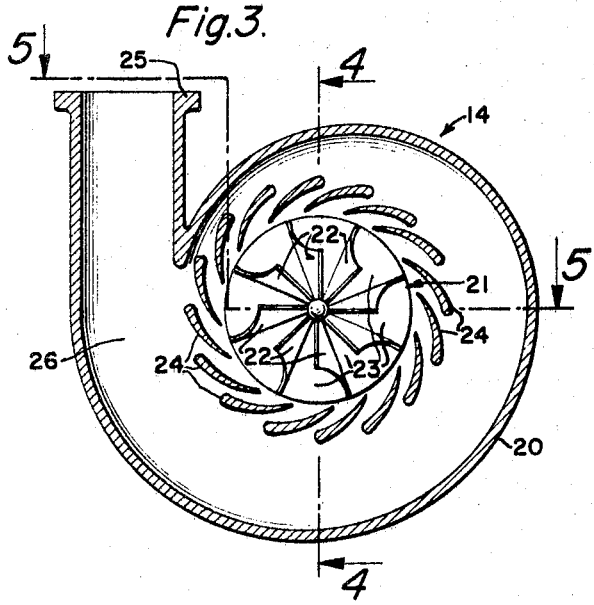
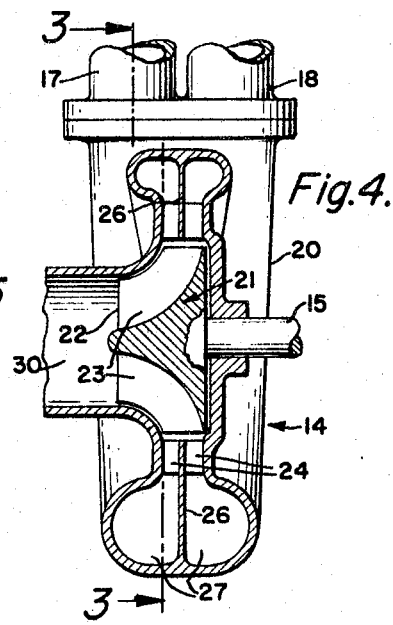
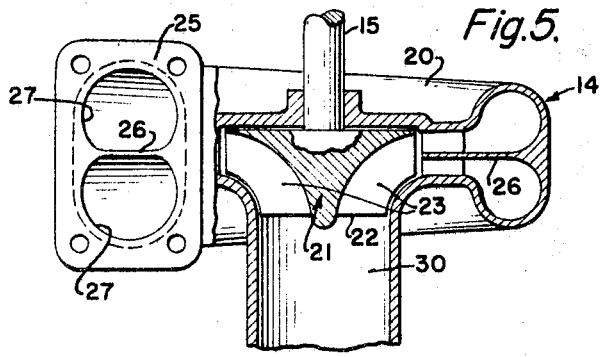
INVENTOR:
JOHN M. CAZIER,
BY
*H. Vincent Harsha*
Attorney.

May 14, 1968  J. M. CAZIER  3,383,092
GAS TURBINE WITH PULSATING GAS FLOWS
Original Filed Sept. 6, 1963  2 Sheets-Sheet 2
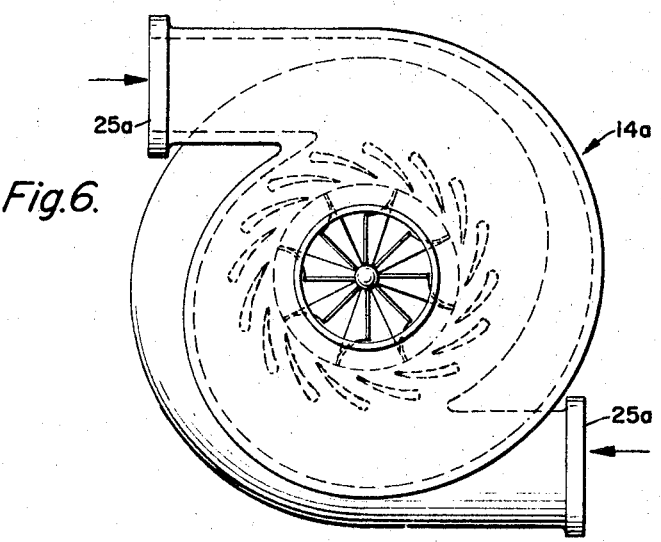
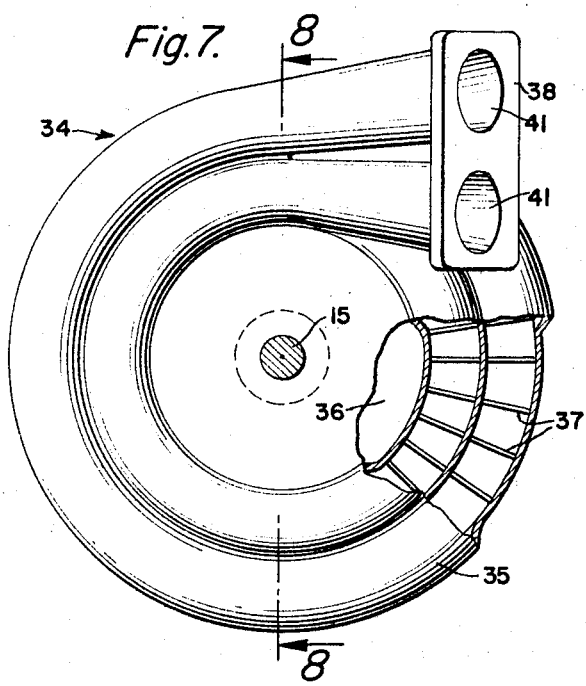
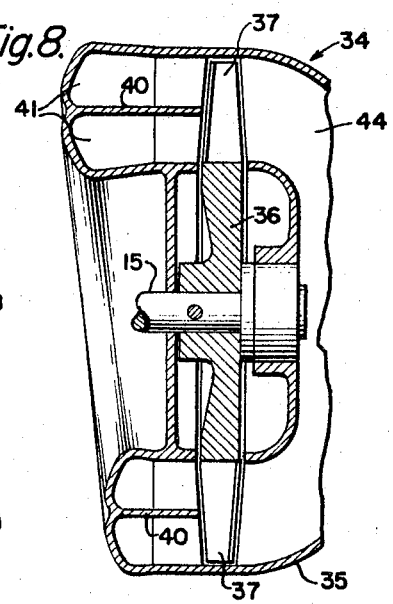
INVENTOR:
JOHN M. CAZIER,
BY
Attorney.

United States Patent Office 3,383,092
Patented May 14, 1968

3,383,092
GAS TURBINE WITH PULSATING GAS FLOWS
John M. Cazier, Los Angeles, Calif., assignor to The Garrett Corporation, Los Angeles, Calif., a corporation of California
Original application Sept. 6, 1963, Ser. No. 307,136, now Patent No. 3,292,364, dated Dec. 20, 1966. Divided and this application Sept. 19, 1966, Ser. No. 580,523
The portion of the term of the patent subsequent to Dec. 20, 1983, has been disclaimed and dedicated to the Public
3 Claims. (Cl. 253—40)

ABSTRACT OF THE DISCLOSURE

A gas turbine adapted to be driven by pulsating gas surges. Two separate conduits are provided for channeling gas independently to a turbine, including a wheel that is journalled for rotation in a turbine casing. The casing includes a partition which provides two separate chambers exposed directly to the high pressure side of the turbine wheel. The separate conduits communicate independently with one or the other of the chambers. The turbine wheel has a plurality of blades which are spaced apart to form gas channels between the blades. An exhaust outlet is provided in the housing on the low pressure side of the turbine wheel. Fluid flows from the chambers through the channels between successive blades to the exhaust outlet. This gas turbine structure takes advantage of the alternate gas surges in each of the conduits and in the chambers to derive maximum energy from the gases.

---

This is a division of application Ser. No. 307,136, filed Sept. 6, 1963, entitled Gas Turbine With Pulsating Gas Flows, now Patent No. 3,292,364.

The present invention relates generally to gas turbines, and more especially to a system including a gas turbine receiving a pulsating flow of hot gases, such as the exahust gases from an internal combustion engine, the system and the inlet passages of the turbine being designed to minimize energy losses in the pulsating gas stream as it is conducted to and passed through the turbine wheel.

Each cylinder of an internal combustion engine provided with the common design of exhaust piping delivers exhaust gas to an exhaust duct at closely spaced intervals of time. The effect of delivering exhaust from a plurality of cylinders to a common duct is to blend the many individual deliveries into a more or less continuous gas flow; but the exhaust gas stream delivered to the exhaust duct from the individual cylinders is characterized by surges or pulses.

At the instant that an exhaust valve opens, the associated cylinder is filled with hot gas at a high pressure. As the valve opens, the gas escapes from the cyilnder in a sharply defined surge that contains the major portion of the gas in the cylinder and causes the gas to travel past the exhaust valve or port at high velocity. This surge of gas is of very short duration; and it is followed during the remainder of the exhaust period by gas which is expelled from the cylinder either by the upward travel of the piston or by the flow of scavenging air within the cylinder. Thus, the total exhaust period during which gas leaves the cylinder is usually characterized by an initial high velocity surge of gas followed by a relatively longer period of gas flow at a much lower velocity. The larger part of the total energy released during an exhaust period for an individual cylinder is in the initial surge of gases. This energy is commonly referred to as blow-down energy as distinguished from the lesser amount of energy contained in the gas stream and delivered during the subsequent pressure period.

The energy losses in a system in which a gas turbine is driven by exhaust gas from an internal combustion engine and which are of concern here may be classified for discussion purposes as those which occur between the engine and turbine and those which occur within the turbine. Losses between the engine and the turbine could, ideally, be eliminated by placing the exhaust valve or exhaust port from the cylinder at the turbine inlet, in which event there would be substantially no duct between the engine and the turbine and no energy loss during transit of the gases from tht engine to the turbine. Obviously, this arrangement is impractical; so in any operational system the gas necessarily loses energy by expansion into the volume provided by an exhaust duct and also by heat loss by radiation to or through the colder walls of the duct.

Once delivered to the turbine inlet, effective recovery of energy from the gas stream then depends chiefly on minimizing energy losses within the wheel, although advantage is also gained by minimizing losses as the gas stream flows through the inlet passages of the turbine casing to the wheel.

The advantages of keeping a suitable high gas velocity at admission to the wheel has been recognized in various other known turbine designs. For this reason, exhaust gas turbines have been designed with reduced admission area by the expedient of allowing admission to the wheel over a sector only, typically 90° or 180° of arc. Such turbines are often referred to as partial admission turbines but are more accurately defined as sector admission turbines.

There is a marked disadvantage to sector admission when the turbine receives gas from a pulsating source, such as an internal combustion engine, because the gas velocities and pressures existing in successive sectors at any given instant of time are not equal. Hence, the inlet to a given channel between two blades on the turbine wheel moves repeatedly in one revolution between zones of relatively high and low total gas pressures as it is successively exposed to gas entering the channel from different sectors around the turbine wheel. The unsteady flow conditions cause lowered efficiency since the blades are commonly designed for maximum efficiency when the channels are full; and the fluctuating gas pressure causes losses commonly referred to as emptying and filling losses. In addition, the sector admission is subject to other losses peculiar to that design, including a pumping loss in the inactive rotor channel and losses due to diffusion at the nozzle discharge.

Hence, it is a general object of the present invention to obtain from a plurality of pulsating gas streams, as a source of energy, the maximum useful work in the form of the output from a turbine driven by the gas streams.

Another object is to provide a system for delivering a gas stream, characterized by a pulsing or fluctuating flow rate, from its source to a turbine inlet with minimum energy loss in transit.

A further object is to provide admission means for a gas turbine receiving a plurality of pulsating gas flows that makes possible maximum utilization of the pulse energy in the turbine.

More particularly, it is an object of the present invention to deliver the exhaust gases of a multi-cylinder internal combustion engine to a turbine wheel with minimum energy loss in transit, and to utilize the high energy pulses of the exhaust gases to drive a turbine which realizes maximum recovery of energy in the form of useful output from the turbine.

These objtcts of the present invention are achieved by providing an internal combustion engine having a plurality of cylinders firing regularly at different times, a convenient and preferred source of pulsating gas flows, with at least two exhaust ducts, each of which is adapted to deliver to the turbine means, in a stream separated from the other duct, exhaust gases from at least one of the engine cylinders so that gas surges in each gas stream occur at different times from the surges in the other gas stream. These exhaust ducts are connected to the turbine means that includes a turbine wheel with blades actively driven by exhaust gases from the cylinders. The turbine means also includes means forming a separate gas inlet passage for each gas stream delivered by the ducts, conducting its respective gas stream separately to the turbine blades substantially entirely around the turbine wheel, so that each channel between successive blades on the turbine wheel simultaneously opens to a plurality of said gas inlet passages, said separate exhaust streams intermingling in the channels.

How the above objects and advantages of the present invention, as well as others not specifically referred to herein, are attained, will be better understood by reference to the following description and to the annexed drawing, in which:

FIG. 1 is a diagrammatic representation of a multiple cylinder internal combustion engine having a turbine driven compressor.

FIG. 2 is a diagram showing the firing order of the cylinders of the engine with relation to crankshaft position.

FIG. 3 is a transverse section through the turbine on line 3—3 of FIG. 4.

FIG. 4 is a section through the turbine on an axial plane as indicated at 4—4 in FIG. 3.

FIG. 5 is a section through the turbine taken on line 5—5 of FIG. 3.

FIG. 6 is a side elevation of the turbine showing a variational construction of the turbine housing.

FIG. 7 is a side elevation of an axial flow turbine with part of the housing broken away, illustrating a variational embodiment of the invention.

FIG. 8 is a transverse section on line 8—8 of FIG. 7.

Referring now to the drawing, and particularly to FIG. 1, there is shown a multiple cylinder internal combustion engine, indicated generally at 10, which is supercharged by means of a compressor 12 driven from gas turbine 14 by shaft 15. Air under pressure is delivered from compressor 12 to the inlet valve of the cylinders through duct 16. The engine is here shown as having six cylinders since this is a common type of internal combustion engine; but it will be realized that the invention is not necessarly limited to any particular number of cylinders. Also, compressor 12 is a commonly found load for the turbine; but it will be realized that this invention is not lmited thereto. The exhaust from the cylinders is delivered to the turbine through a plurality of ducts, here two in number and indicated at 17 and 18. These ducts are each connected to three cylinders, manifold 17 being connected to cylinders 1, 2 and 3 while manifold 18 is connected to cylinders 4, 5 and 6. As will become evident from later description, ths is not the only arrangement of cylinders and ducts possible; but it is, in general, desired to connect the cylinders in small groups of one or more to each of a plurality of exhaust ducts.

Turbine 14 of typical design is shown in greater detail in FIGS. 1–3 and generally comprises housing 20 within which is rotatably mounted turbine wheel 21 upon drive shaft 15. Wheel 21 is provided with a plurality of blades 22 against which the thrust of the incoming gas stream is exerted to cause the wheel to revolve, the space 23 between each two successive blades being a gas passage or channel.

Surrounding wheel 21 there is located a plurality of stationary vanes 24 which direct the incoming gas stream against the wheel. Though turbine 14 is shown as havng fixed vanes as typical of turbines to which the present invention may be applied, it will be understood that vaneless nozzle turbines may also be used. Wheel 21 is of the radial flow type. Casing 20 forms an inlet scroll conducting the incoming gases through a spiral path, as is well known in the art. The inlet to the turbine casing is shown particularly in FIG. 3 in which it will be seen that the inlet at flange 25 is divided by septum or partition 26 into two separate gas passages 27. Partition 26 preferably lies in a radial plane perpendicular to the axis of rotation of shaft 15 and divides the interior of the turbine casing into two gas inlet passages of substantially equal area in cross-section.

With two separate inlet passages, there is one for each of the gas streams delivered by ducts 17 and 18. These ducts are each connected (FIG. 4) to one of the two passages 27. Thus each gas stream delivered by a duct 17 or 18 is conducted separately of the other gas stream to the turbine blades and is permitted entry to the turbine blades around the entire circumference of the wheel. The two gas streams intermingle in the channels of the turbine wheel.

After leaving wheel 21, the gases are exhausted from channels 23 into a common outlet 30 through which all the exhaust gases are discharged from the turbine in a common stream.

In order to retain in the exhaust gases a maximum proportion of the energy initially available, the exhaust piping between the engine and the turbine has been subdivided into a plurality of ducts, each connected to only a portion of the cylinders in the engine. The number of cylinders in a group connected to each exhaust duct can be one or more; and from a practical standpoint it is quite satisfactory in a six cylinder, four stroke cycle engine to provide two exhaust ducts as shown at 17 and 18. More than two ducts, and a corresponding number cf inlet passages 27, may be desired under some conditions, as with an engine having a larger number of cylinders. Since each duct now only has to carry the exhaust gases from a small number of cylinders, the cross-sectional area of the duct can be reduced substantially below that necessary when all cylinders are connected to a common duct.

The engine of FIG. 1 is assumed to fire in the commonly used sequence 1–5–3–6–2–4. This evenly spaces apart the surges in each exhaust duct by 240° of crankshaft revolution. Other firing orders may make rearrangement of exhaust connections to the cylinders advisable. This arrangement of two ducts insures that there is no interference in a duct between successive gas surges.

The result of this design is that the volume of the duct into which each cylinder exhausts is substantially reduced, compared with undivided ducting, and is made as small as is practical in relation to the volume of the cylinder. Furthermore, the surface area of each duct is now small. With this arrangement the energy of the gas is maintained as high as possible and the heat loss is also minimized.

As explained already, the two exhaust streams flowing from the individual ducts 17 and 18 are still maintained separated within the turbine casing by radial septum 26 up to or close to the point at which the exhaust gases enter the channels between blades 22. Each of the two inlet passages 27 within the turbine casing provides entry to the turbine wheel entirely around the wheel so that the gas pressure in either passage 27 is substantially equal at all points within the passage around the entire circumference of the turbine wheel. This condition greatly reduces losses in the wheel commonly referred to as emptying and filling losses.

As a heat engine, a gas turbine attains its highest operating efficiency while operating at or near the given conditions for which it is designed. Consequently, it utilizes the energy supplied to it by the exhaust gases most effectively when steady state conditions can be maintained; and it is well known that the efficiency of the turbine drops off rapidly if there is any substantial departure from optimum designed conditions. Because of these factors, turbines with inlet passages of known designs do not utilize effectively the energy contained in exhaust gas streams which are pulsating in character. Turbines for this service are normally operated at very high rotational speeds, perhaps twenty to thirty times the engine speed, and consequently the turbine wheel normally makes several revolutions during the period of exhaust gas flow from any given cylinder. In a turbine having sector admission according to any one of several well known designs in the art, it follows that the wheel makes several revolutions while the exhaust gas flows through a particular sector of the inlet passage into the wheel. Since the total arc around the wheel is divided into several admission sectors which are at different gas pressures and velocities, the inlet of each gas flow channel of the wheel passes successively from the regions of high inlet gas pressure and velocity to regions of much lower gas inlet pressure and velocity.

In such a turbine with sector admission, as the wheel revolves, a given flow channel upon entering a high pressure sector from a low, may have little or no gas flowing into it. At this point, the gas filling the channel may be nearly stationary relative to the flow channel and is nearly at wheel discharge pressure. Once in the high pressure sector, gas enters the channel at high velocity; but in order to do so it must first overcome the inertia of the gas already occupying that channel and accelerate it to a high velocity relative to the channel. During this process of accelerating the gas, filling losses occur. These are turbulent losses associated with forcing a high velocity, high pressure gas stream into a curved duct which is already occupied by a gas at a lower pressure and velocity. The losses occur as a result of the turbulent mixing caused by the steep velocity gradient and of local high velocities resulting from gas flow separation from the channel walls. It will be obvious from this that the total mass of gas which had originally occupied the channel is now expelled from the wheel through the discharge end of the channel into outlet duct 30; but discharge takes place at a lower average velocity relative to the wheel than is desirable, with the result that a smaller amount of power is extracted from the moving gas stream than would otherwise be possible.

After the channel has passed into the sector of high pressure and has been subjected to the high pressure entering gas stream for a while, the channel is filled and gas flows through it in relatively non-turbulent flow at high velocity with the result that power is extracted with relatively good efficiency. However, it will be realized that this period of optimum flow condition exists for only a portion of the transit of the channel across the high pressure sector.

As the same channel passes now from the high pressure sector into the low pressure sector, the channel is subjected to emptying losses. These are turbulent losses associated with violent recirculation as the leading portion of the channel inlet ceases to be fed gas at high velocity and pressure while the trailing portion of the channel inlet continues to be fed gas at high velocity and pressure. Turbulent losses caused by local separation of gas flow from the channel walls also occur because of the uneven feeding of gas to the channel. Additional turbulent losses occur which are caused by the velocity gradient of the deceleration of the gas relative to the channel as the energy available to push the gas through the channel is shut off. The mass of gas which occupies the channel as it passes the low pressure sector leaves the wheel with a lower average relative velocity than is desirable; hence less power is extracted from it than is desirable.

Emptying and filling losses described above exist in each wheel channel in a known turbine having sector admission during each revolution of the wheel. The magnitude of these losses is governed by a number of factors, for example, the number of channels or blades on the wheel, the rotational speed of the wheel, the number of sectors, and the instantaneous pressure and velocity differentials existing between successive sectors.

The present invention, with septum 26 dividing the inlet passage into two separate passages each of which provides gas entry to the wheel entirely around the wheel, eliminates the above described filling and emptying losses. It is obvious from the description of the invention that now the individual flow channels of the wheel are each fed continuously throughout their rotation. This is true even though the pressure fluctuates within each passage as it rises with each surge and falls between successive surges of exhaust gas. As a consequence the turbine of the present invention has been found in practice to extract much more efficiently the energy contained in the gas stream delivered to it than has heretofore been possible.

FIG. 6 illustrates a modification of the turbine of FIGS. 3–5 in which turbine 14a has two inlets and 25a spaced 180° around the wheel axis instead of being side-by-side as in FIG. 5.

When the present invention is applied to a radial flow or mixed flow turbine wheel as described above, exhaust gases are admitted to the turbine wheel from each of the inlet passages 27 entirely around the turbine wheel but over only a portion of the axial length of the wheel's inlet.

The present invention may be equally well used with an axial flow turbine, as is shown in FIGS. 7 and 8. In an axial flow turbine exhaust gases are also admitted to the turbine wheel entirely around the wheel, or substantially so, but over only a portion of the radial dimension of each of the blades.

Referring more particularly to FIGS. 7 and 8, it will be seen that the turbine 34 comprises a casing 35 within which is rotatably mounted turbine wheel 36 attached to shaft 15. Around its periphery, wheel 36 is provided with a plurality of radially extending blades 37. The turbine is provided with an inlet flange 38 to which the two exhaust ducts 17 and 18 are connected.

Partition 40 extends around at least the major portion of the turbine wheel to divide the total inlet passage into two concentric gas inlet passages 41. These passages are designed to be of substantially equal size, and as will be seen from FIG. 7, one of the passages directs gas against approximately the outer half of blades 37 while the other passage directs gas against approximately the inner half of blades 37. In this manner it will be seen that each of the two gas passages directs the gas surges from one of the exhaust ducts to the channels between successive blades 37 substantially entirely around the turbine wheel. Within the channels defined by blades 37, the gases from a plurality of the inlet passages 41 intermingle while flowing into and within the channels between the blades and are discharged into outlet passage 44 which provides a common discharge from the turbine for all the incoming gases.

As with the embodiment of the invention first described, more than two gas inlet passages 41 may be provided, in which case the number of ducts from engine 10 is correspondingly increased.

From the foregoing description of the system, it will be seeen that various changes may be made in the detailed design of the component parts of the turbine and the exhaust ducting without departing from the spirit and scope of the present invention. Accordingly, it is to be understood that the foregoing description is considered to be illustrative of, rather than limitative upon, the present invention.

I claim:

1. A gas turbine for use with pulsating gas surges comprising:
   a wheel having a plurality of blades thereon;
   inlet means to permit entry of a plurality of gas streams;
   a casing enclosing said wheel and providing a plurality of separated gas passages for conducting separately each of said plurality of gas streams to the wheel substantially around the cirmuference of said wheel, said passages having substantially equal areas in cross section, thereby producing substantially identical areodynamic effects on each of said gas streams;

each channel between successive blades on the turbine wheel receiving gas streams from a plurality of said gas passages, said separate gas streams intermingling in the channels, whereby the gas streams have a substantially equal and additive rotational effect on said wheel when mixed in the channels between the blades, thereby resulting in improved efficiency; and exhaust means to permit flow of said gas from said channels.

2. A gas turbine for use with pulsating gas surges comprising:

a wheel having a plurality of blades thereon;

inlet means to permit entry of a plurality of gas streams;

a casing enclosing said wheel and providing a plurality of separated gas passages for conducting separately each of said plurality of gas streams to the wheel substantially around the circumference of said wheel, each of said passages producing substantially identical aerodynamic effects on each of said gas streams;

each channel between successive blades on the turbine wheel receiving gas streams from a plurality of said gas passages, said separate gas streams intermingling in the channels, whereby the gas streams have a substantially equal and additive rotational effect on said wheel when mixed in the channels between the blades, thereby resulting in improved efficiency; and exhaust means to permit flow of said gas from said channels.

3. A gas turbine comprising:

a wheel having a plurality of blades thereon;

inlet means to permit entry of a plurality of gas streams;

means for conducting said gas streams independently from sources of pulsating gas flows to said turbine inlet means, said conducting means being substantially unobstructed;

a casing enclosing said wheel and providing a plurality of separated gas passages for conducting separately each of said plurality of gas streams to the wheel substantially around the circumference of said wheel, each of said passages producing substantially identical aerodynamic effects on each of said gas streams;

each channel between successive blades on the turbine wheel receiving gas streams from a plurality of said gas passages in such manner that said separate gas streams combine in said channels, whereby the gas streams have a substantially equal and additive rotational effect on said wheel when mixed in the channels between the blades, thereby resulting in improved efficiency; and exhaust means to permit flow of said gas from said channels.

References Cited

UNITED STATES PATENTS

| | | | |
|---|---|---|---|
| 1,152,361 | 8/1915 | Thomas | 60—13 |
| 1,428,925 | 9/1922 | Thomas | 60—13 |
| 1,889,816 | 12/1932 | White | 60—13 |
| 2,444,644 | 7/1948 | Fullemann | 60—13 |
| 2,730,861 | 1/1956 | Buchi | 60—13 |
| 3,081,019 | 3/1963 | Freevol | 230—133 X |
| 3,270,495 | 9/1966 | Connor | 60—13 |
| 3,292,364 | 12/1966 | Cazier | 60—13 |

FOREIGN PATENTS

| | | |
|---|---|---|
| 670,067 | 8/1929 | France. |
| 350,712 | 6/1931 | Great Britain. |

EVERETTE A. POWELL, Jr., *Primary Examiner.*

MARTIN P. SCHWADRON, *Examiner.*